Figure 1:
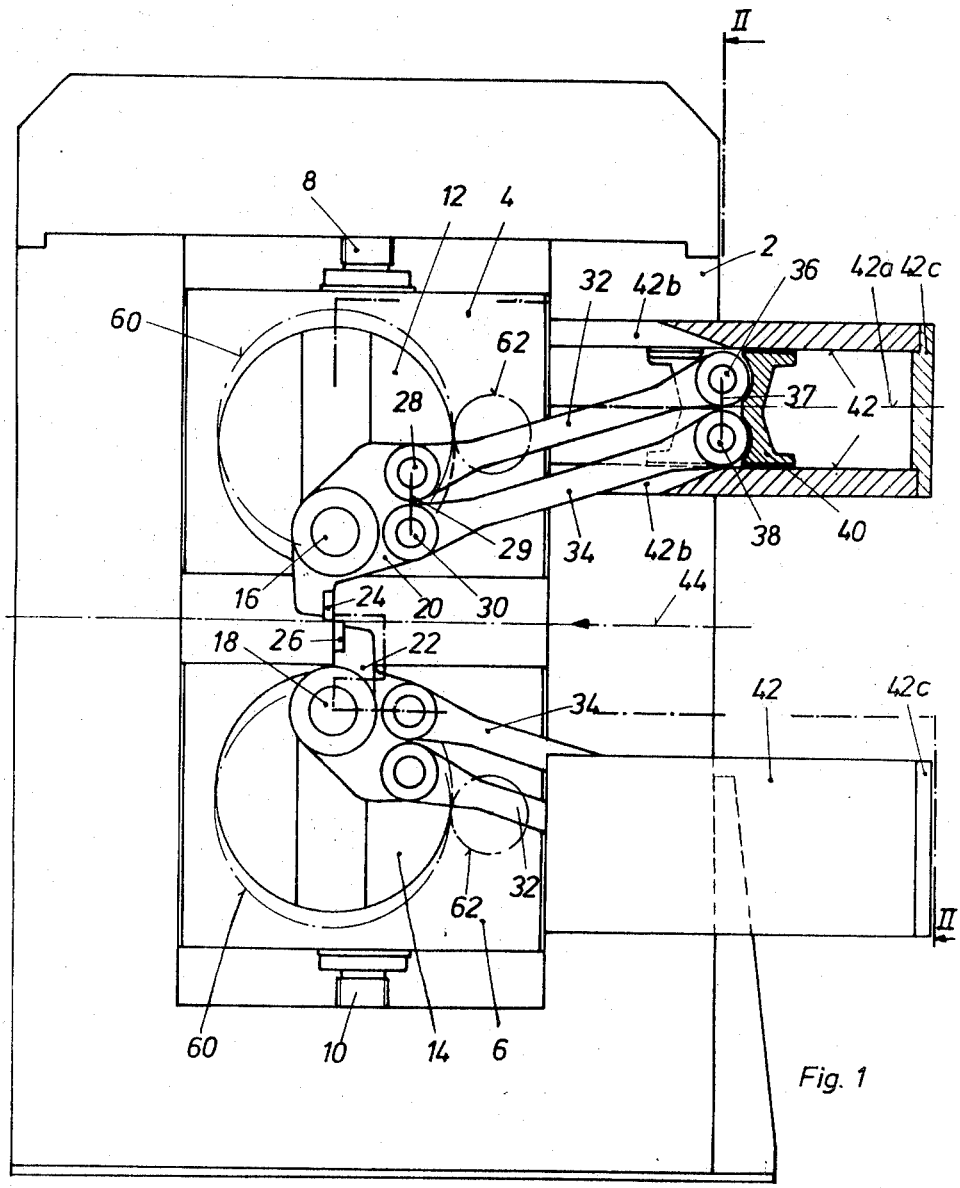

United States Patent
Fries

[15] 3,643,537
[45] Feb. 22, 1972

[54] CONTINUOUSLY ROTATING SHEARS

[72] Inventor: Gunter Karl Fries, Neukirchen-Saar, Germany

[73] Assignee: Moeller & Neuman GmbH

[22] Filed: Aug. 17, 1970

[21] Appl. No.: 64,293

[30] Foreign Application Priority Data

Aug. 10, 1969 Germany..................P 19 42 355.3

[52] U.S. Cl................................................83/305
[51] Int. Cl.............................................B26d 1/56
[58] Field of Search ..................83/305, 311, 327, 328

[56] References Cited

UNITED STATES PATENTS

3,398,616   8/1968   Elineau.....................83/305

Primary Examiner—Andrew R. Juhasz
Assistant Examiner—David R. Melton
Attorney—John J. Dennemeyer

[57] ABSTRACT

A continuously operating rotating shears for cutting rolled products to definite lengths includes cutter supports mounted on crankpins and controlled by pairs of parallel connecting rods guided at their remote ends by means of guideways. Shafts carrying the crankpins are supported in eccentric bushings which can be rotated at a different, but synchronously related, speed from the cutter shafts to provide for a variable number of miss-cuts between active cuts.

4 Claims, 2 Drawing Figures

CONTINUOUSLY ROTATING SHEARS

The invention relates to continuously rotating shears for cutting or parting travelling rolled material into definite adjustable lengths, with a device for bringing the cutter blade momentarily out of action for the purpose of executing a variably adjustable number of miss-cuts between effective cutting operations. Such shears are preferred to hereinafter as rotating continuous parting shears.

The state of the art offers numerous possibilities for the construction of a device for momentarily bringing the cutter blades out of operation. Thus German Pat. No. 471,407, discloses rotating shears for parting rolled strip or rod having a radially adjustable rotary cutter which can be moved radially outwardly to a cutting position from an inactive position in which it does not operate for cutting. The idea of carrying out idle cuts by deflecting the cutters lies in the same field. British Pat. No. 1,017,427, shows a rotating shears with cutter carriers supported in rockers which can be brought into and out of the cutting position as desired by the pivotal movements of the rockers. Also in the construction of shears, especially of flying shears for parting sheet or plate material it is known to be able to execute miss-cuts by means of rotatable eccentrics. A particular construction is described in East German Pat. No. 18,655, in which the cutter levers are rotatably supported on crankpins, which in turn are supported in hollow shafts. The cutter levers are rotated through the hollow shafts by means of guide blocks whereas the inner crankshafts are driven at a different gear ratio. According to the transmission ratio cuts are effected after one, two or more revolutions of the hollow shafts at the oppositely disposed dead center positions of the crankshafts.

The problem has arisen of providing a rotating parting shears as already defined with a parallel support for the cutters during their rotation in order to obtain the clean cutting action and the minimum deformation at the cut ends of the rolled rods or bars. The invention is directed to this problem and to providing a rotating shears which replaces the cold shears arranged beyond the cooling beds of steel rod rolling mills for cutting several rods or bars at once and thus to providing a continuous runoff of the cooled rods or bars.

Also in reference to the parallel supporting of cutters of rotating shears, there is a wide range of possibilities. One of these possibilities consists in the fact that cutters are held in position by means of a guideway for oscillating rod members which engage the cutter carriers rotatably supported on crank pins of the cutter shaft as is shown in German Pat. No. 460,466. Numerous proposals have been made to support the cutters of a rotating shears parallel to one another by means of a rotary drive (German Pat. No. 477,893). In practice, the so-called parallel crank shears has been used mainly for producing straight cuts (German Pat. No. 1,116,204). Further there are special types which permit either no exact parallel mounting of the cutters to be obtained or are too complicated in construction (German Pat. No. 584,223, 903,773, 1,128,887, and 1,085,747).

According to the state of the art, there is a multiplicity of possible combinations for solving the aforesaid problem of providing a continuously rotating cutting shears, having a device for carrying out a variable number of miss-cuts with a device for holding the cutters parallel during their rotation. Thus it would for example be possible to provide the usual parallel crank shears intended for producing straight cuts, with an eccentric control for the purpose of carrying out miss-cuts.

In this case however also the auxiliary pair of crankshafts must be supported in eccentrics which must be adjusted in speed to suit that of the pair of crankpins of the main cutter shaft. This would result in an extremely complicated and thus virtually impractical shears.

On the other hand a shears with a parallel mounting of the cutter by means of planet wheels would require that the bearings of the planet wheels would also have to follow the eccentricity of the cutter shaft. Also with this combination the shears would be too complicated and expensive.

The invention avoids these difficulties by the use as a bearing for the two cutter shafts of rotatable eccentric bushings which are driven synchronously for carrying out miss-cuts, combined with a parallel support of the cutters by means of at least one slide guide for oscillating connecting rod components which engage rotatably supported cutter carriers on crankpins of the cutter shafts. The essential advantage of this combination according to the invention resides in the fact that two systems are combined together which can be readily constructed and arranged independently of one another. The parallel mounting of the cutters by means of a slide guide has no effect on the arrangement for carrying out the miss-cuts by means of rotatable eccentric bushings and conversely. This is as already stated, not the case with other possible combinations of miss-cutting devices and devices for parallel supporting of the cutters.

In order to obtain the greatest possible range of adjustable cut lengths with parting shears, it is known to support the cutter shafts in adjustable chocks or like units and to make the cutters radially adjustable. In this case consideration should be given in the construction of the drive for adjusting the rotatable eccentric bushings. The invention proposes that the rotatable eccentric bushings shall be supported in vertically adjustable chocks or like bearing members and the crankpins of the cutter shafts should be made radially adjustable whereby both the cutter shafts and also pinions supported in the chocks are driven for rotating the eccentric bushings by means of connecting shafts.

With the known device for parallel mounting of the cutters by means of guideways, not only does one of the adjuster rods which is connected to one cutter carrier participate in the circular movement of this cutter pin, but also the rectilinear guide for the adjuster rod. This arrangement is improved by the invention with the object of being able to arrange at least the linear guideway in a fixed position. This is obtained by the fact that the parallel mounting of the cutter consists in the fact that each of the freely rotatable cutter carriers on the crank pins of the cutter shafts is constructed as a coupling member for a parallel crank drive of which the member parallel to the coupling member is guided rectilinearly. Conveniently each parallel crank drive is associated with a slide guide for the member, which forms a crossheadlike guide block to which the two parallel cranks are Linked.

Figure 2:
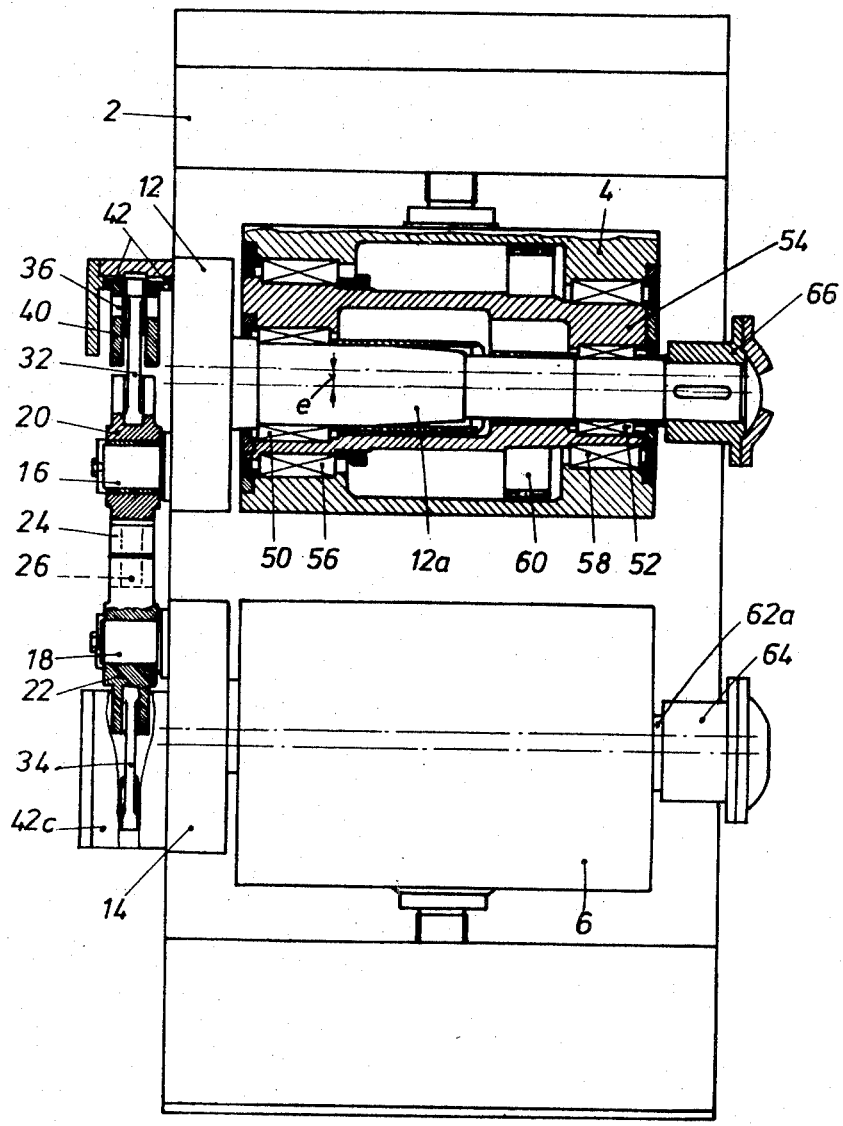

One constructional example of a rotating parting shears according to the invention is shown on the drawing wherein:

FIG. 1 shows a side view with the upper linear guide as well as the guide block in section, and FIG. 2 is a vertical section on the line II—II in FIG. 1.

FIG. 1 shows the main parts of the shears including a shear frame 2, similar to a roll stand in the form of a capped stand, with two chocks 4, 6 in the frame openings which are vertically adjustable by means of compression screws 8, 10. The rotating parts are crank discs 12, 14 with crankpins 16, 18 on which the cutter supports 20, 22 are supported in a freely rotatable manner. The crankpins 16, 18 are radially adjustable in any convenient manner in the crank discs 12, 14 in order that the pitch circle of the cutter path can be varied by adjustment of the chocks 4, 6 to suit the speed of the rolled product being handled.

The arrangement for maintaining parallelism of the cutters will now be described. For this purpose the cutter supports 20, 22 are provided with two holders for pivot pins 28, 30 supporting parallel connecting rods 32, 34 in each case which are supported at their other ends by connecting pins 36, 38 in a crossheadlike guide block 40. This guide block 40 is rectilinearly guided in a stationary horizontal guideway 42.

The connection of the axial centers of the pivot pins 28, 30 by the supports 20, 22 forms a link 29 and the connecting member carrying the two pivot pins 36, 38 forms a link 37. Both links 29 and 37 and the parallel connecting rods 32, 34 form a parallelogram linkage so that for one revolution of the cutter supports 20, 22 the link 29 does not vary from its original vertical position because of the guiding of the link 37 by the crossheadlike guide block 40; thereby the cutter supports 20, 22 are each always moved parallel to themselves during the rotation and thus also the cutters 24 and 26 always remain upright and the cutter supports 20, 22 rotate freely on the crankpins 16, 18.

The guideway 42 is arranged at such a distance from the horizontal plane 44 of the rolled product that the heating of the guideway is as small as possible. The lower guideway is not shown in detail but is a mirror image of the upper guideway construction.

The guideways 42 are moveover provided with slots 42b at the ends adjoining the cutter supports in order to allow for the passage of the parallel connecting rods 32, 34 as they swing up and down. The guideways 42 secured to the shears frame 2 are moreover closed by a cover 42c of which the cover of the lower slide guide 42 is shown partially cut away in FIG. 2 in order to show the connecting rod 34 and its connection to the lower guide block 40.

The device for executing miss-cuts will now be described in conjunction with FIG. 2. As indicated by the section II—II in FIG. 1 the upper chock 4 is shown in vertical section and the lower chock 6 in elevation. It will be seen that in the case of the upper chock 4 that the cutter shaft 12a forming a unit with the crank disc 12 is supported by two bearings 50, 52 eccentrically in an eccentric bushing 54 and is supported in turn by bearings 56, 58 in the chock 4. The eccentric bushing 54 carries a large gear wheel 60 the pitch circle of which is also marked 60 in FIG. 1. A pinion is provided in the upper chock 4 in a manner not further described to rotate this gear wheel 60 having a pitch circle 62. The offset of the axis of this pinion is indicated in FIG. 2 by the chain-dot lines and the location of the pinion of the lower chock 6 is indicated at 62a as well as coupling joints 64 for connection to jointed driving spindles, which are necessary because the chocks 4 and 6 are vertically adjustable. For the same reasons the two cutter shafts 12a are synchronously driven by the jointed spindles through coupling joints 66. The driving unit for the jointed shafts for the synchronized drive both of the cutters 12a and also of the pinions 62 for adjusting the eccentric bushings 54 are not shown.

As will be seen from FIG. 2 the cutter shaft 12a is in the lowermost dead center position in the indicated position at the eccentric bushing 54. Thereby the cutters 24, 26 are operative for cutting. In order to provide for a given number of idle cuts for continuously operating shears, the eccentricity of the eccentric bushings 54 indicated at e in FIG. 2 is changed through one full revolution by rotation of the pinion 62 so that the cutter shafts 12a are moved from one another and thereby also the cutters 24, 26. After one complete revolution of the eccentric bushings 54 the cutters 24, 26 are again in the cutting position. The speed ratio between the rotation of the eccentric bushings 54 and the rotation of the cutter shafts 12a is operatively variable in order that the number of miss-cuts between successive functional cuts can be varied by rotation of the eccentric bushings 54.

The operative measures necessary for this purpose, for the synchronization as well as also a necessary continuously variable gear in the main drive for adapting the peripheral speed of the cutters to the speed of the rolled product are well known to those skilled in the art, and it has not been thought necessary to describe the features in detail.

What I claim is:

1. Continuously operating rotary shears for parting rolled products to definite lengths, comprising cutter shafts, rotatable eccentric bushings supporting said shafts, means for driving said shafts and said bushings at synchronously related speeds to produce a given number of miss-cuts between successive active cuts, pivoted cutter supports driven by the cutter shafts, cutters mounted on said supports, connecting rods pivoted to said supports and to slider members to maintain the cutters parallel, and guideways for said slider members.

2. Rotary shears according to claim 1, characterized in that the rotatable eccentric bushings are driven by pinions and supported in vertically adjustable chocks, and the cutter shafts include radially adjustable crankpins, and that both the cutter shafts and the pinions are driven at different synchronously related speeds by means of jointed connecting shafts.

3. Rotary shears according to claim 1, characterized in that the cutter supports are freely supported for rotation on crankpins carried by the cutter shafts and said cutter supports are pivoted at spaced points to pairs of parallel connecting rods, and that the ends of the connecting rods remote from the cutter supports are connected at spaced points to a member movable in a Linear guideway.

4. Rotary shears according to claim 3, characterized in that a parallel pair of connecting rods is associated with a guide block to which the two parallel connecting rods are pivoted.

* * * * *